United States Patent [19]
Rott

[11] Patent Number: 5,337,783
[45] Date of Patent: Aug. 16, 1994

[54] POPPET VALVE

[75] Inventor: Horst Rott, Karlstadt-Mühlbach, Fed. Rep. of Germany

[73] Assignee: Mannesmann Rexroth GmbH, Fed. Rep. of Germany

[21] Appl. No.: 110,953

[22] Filed: Aug. 24, 1993

[30] Foreign Application Priority Data

Aug. 24, 1992 [DE] Fed. Rep. of Germany ....... 4228059

[51] Int. Cl.$^5$ ............................................ F16K 11/086
[52] U.S. Cl. ............... 137/625.27; 137/625.5; 137/901; 251/321
[58] Field of Search .............. 137/901, 625.27, 625.5; 251/320, 321

[56] References Cited

U.S. PATENT DOCUMENTS

| | | | |
|---|---|---|---|
| 1,182,166 | 5/1916 | Graham | 137/901 X |
| 2,342,659 | 2/1944 | Grove et al. | 137/901 X |
| 4,391,183 | 7/1983 | Broms et al. | 137/901 X |
| 4,962,791 | 10/1990 | Rott | 137/901 X |

*Primary Examiner*—Arnold Rosenthal
*Attorney, Agent, or Firm*—Cushman, Darby & Cushman

[57] ABSTRACT

A poppet valve comprising a ball supported within an axial bushing, the ball being urged onto the valve seat by an operating element and being lifted off the valve seat by the force of a spring, wherein pressure is applied to the ball surface within the valve seat, is characterized in that the end of the bushing facing the valve seat protrudes in tangential direction beyond the periphery or equator of the ball and defines together with the ball surface in this region a space for fluid flow inversion to thereby further improving the lifting aid achieved by the bushing with respect to a further decrease of the switching delay together with an increase of the flow rate while maintaining the same flow losses as prior art poppet valves with such bushing.

1 Claim, 2 Drawing Sheets

POPPET VALVE

TECHNICAL FIELD

This invention relates to a poppet valve and in particular to a directional poppet valve of the ball type. More particularly the invention relates to a poppet valve comprising a ball supported within an axial bushing, the ball being adapted to be urged onto the valve seat by an operating element and to be lifted off the valve seat by the force of a spring, wherein pressure is applied to the ball surface within the valve seat.

DESCRIPTION OF PRIOR ART

Such poppet valves are known from DE 33 10 785 C2. Other prior art poppet valves are disclosed in DE 37 32 446 C2 and DE 30 06 530 A1 (corresponding to GB 20 43 840 A). With such valves, the operating element keeping the valve ball on its seat may be operated mechanically, pneumatically, hydraulically, or electrically by means of a solenoid. Lifting the ball off the valve seat is effected by means of a spring as soon as the force acting on the operating element is relieved or switched off.

The poppet valve of the invention comprises a valve seat and a valve ball as well as a bushing or sleeve receiving the valve ball. The bushing has an end face facing the valve seat.

After lifting the valve ball off the valve seat said end face of the bushing is exposed to the flow of fluid flowing between the valve seat and the ball whereby an impulse force or flow force is generated supporting the spring force until the cross section of the passage is fully opened. By this lifting aid the fluid flow rate may be increased to up to twice the value of conventional poppet valves without such bushing.

SUMMARY OF THE INVENTION

It is the object of the invention to further improve the lifting assistance obtained by said bushing with respect to a further decrease of the switching delay together with an increase of the flow rate while maintaining the same flow losses as prior art poppet valves with such bushing.

According to one aspect of the invention, this object is achieved by the end of the bushing facing the valve seat protruding in tangential direction beyond the periphery or equator of the ball and defines together with the ball surface a space for fluid flow inversion.

According to another aspect of the invention, a spreader ring or snap ring for mounting the bushing to the ball is disposed in a circumferential groove in the interior of the end of the bushing protruding towards said valve seat beyond the periphery or equator of the ball and the opposite end of the bushing is provided with an inwardly extending portion or flange for supporting the ball.

According to a further aspect of the invention, a poppet valve is provided comprising a housing, at least one valve seat within said housing, a ball as a valving element within said housing, said ball being adapted to engage said valve seat, a bushing arranged on said ball, said bushing having an end facing said valve seat, wherein said bushing end defines a space open towards said valve seat to deflect fluid flow flowing past said valve seat and said ball for an increased impulse force or flow force.

According to a still further aspect of the invention, a poppet valve is provided comprising a housing means having an axial bore an forming at least one valve seat, port means in said housing means and adapted to be connected to at least two of a pump, a reservoir and a user, a ball reciprocally mounted in said bore and adapted to cooperate with said at least one valve seat so as to provide or block fluid communication between said ports, and a bushing fixedly mounted on said ball, said bushing having an impulse region facing towards said at least one valve seat so as to provide for an impulse force or flow force which tends to move said ball away from said at least one valve seat, wherein said impulse region is formed to define a space such that said impulse force is increased.

SHORT DESCRIPTION OF THE DRAWINGS

A preferred embodiment of the invention will now be explained with reference to the accompanying drawings, in which:

FIG. 1 is a sectional view of a poppet valve using a ball as poppet or seat element; and FIG. 2 is an enlarged illustration of the seat area of FIG. 1.

DETAILED DESCRIPTION OF A PREFERRED EMBODIMENT

Figure 1:
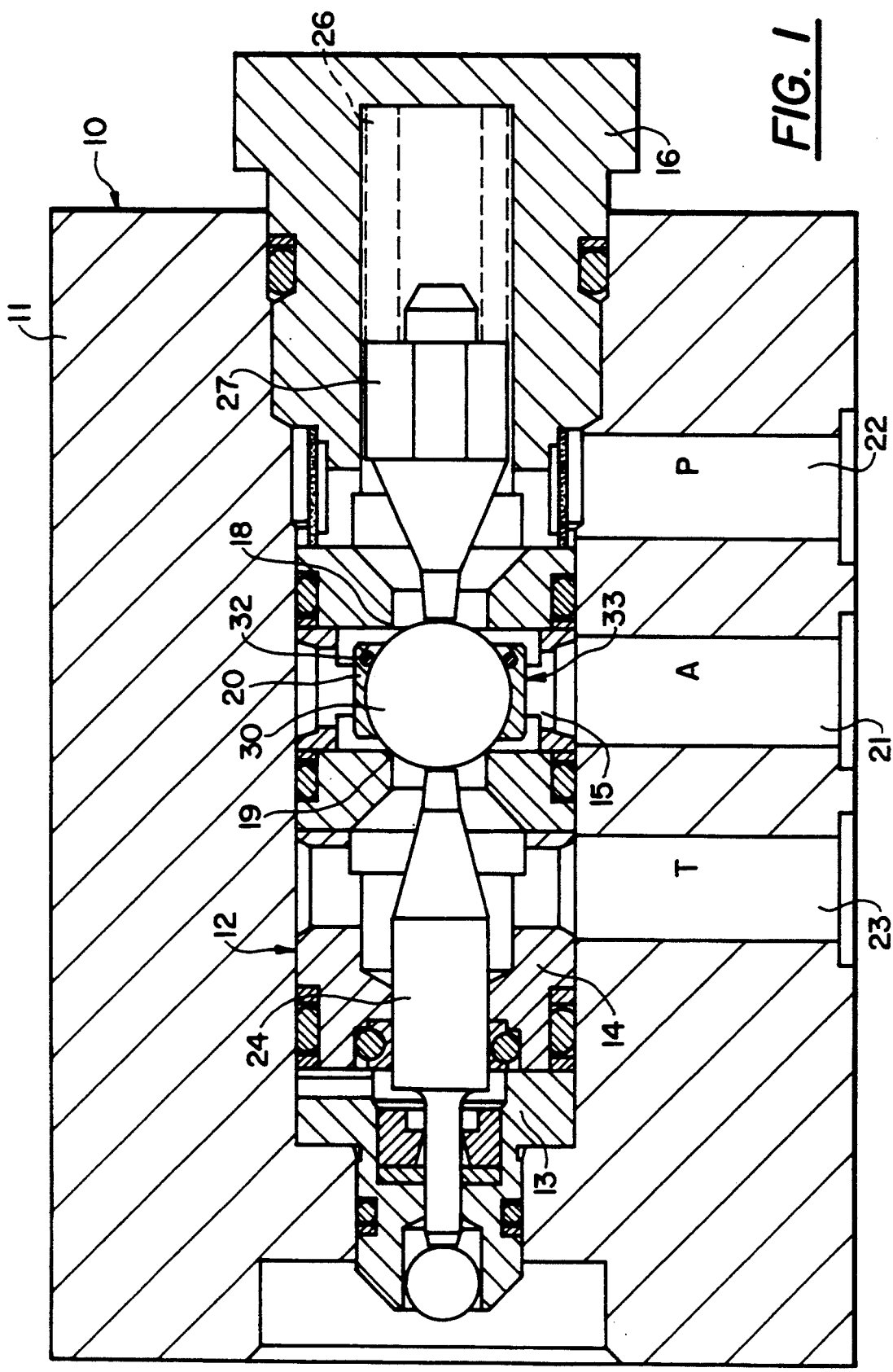
Figure 2:
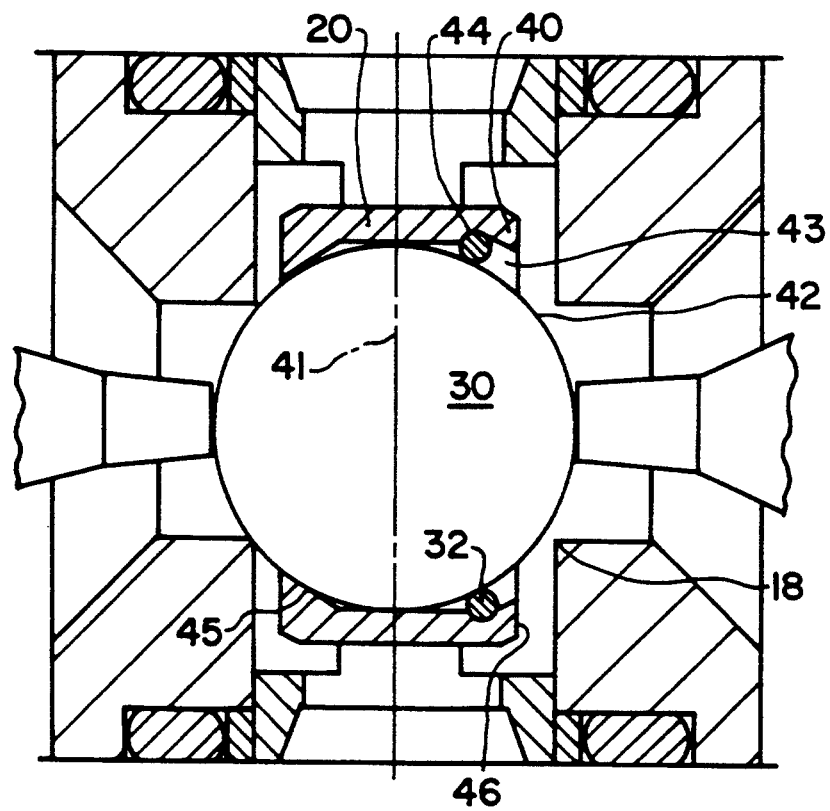

In FIG. 1 there is illustrated a 3/2 way poppet valve 10 the housing 11 of which is provided with an axial bore 12 in which inserts 13, 14, 15, and 16 are arranged. The centrally disposed insert 15 comprises first and second valve seats 18 and 19 which the valve ball 30 may engage as a poppet. In this way the working port or user port 21 leading to a load or user may be connected either to port 22 leading to a source of pressurized fluid (not shown) or to port 23 leading back to the reservoir. The valve ball 30 is urged by an operating element 24 into the first valve seat 18. The necessary force may be applied mechanically, pneumatically, hydraulically, or electrically by means of a solenoid. Thus, the fluid path from port 22 of pressurized fluid to user port 21 is blocked.

A spring 26 is provided to open this fluid communication, said spring being disposed within insert 16 and acting on the valve ball 30 via a pin 27. Once the closing force acting on operating element 24 is relieved, then spring 26 lifts valve ball 30 off the first valve seat 18, the lifting action being supported by the pressure of the source of pressurized fluid acting on the ball surface within the first valve seat 18. As soon as the valve ball 30 is lifted off the seat, this supporting force is no more active since the pressure of the source of pressurized fluid is also acting downstream of the first valve seat 18.

In order to ensure complete and safe opening of the valve ball 30 until abutment at the opposite or second valve seat 19, said valve ball 30 is disposed within a bushing 20 having an end 40 which is facing the first valve seat 18 and thus is facing the pressure of the source of pressurized fluid and which is extended in tangential direction beyond the periphery or equator 41 of the ball. This extension together with the ball surface 42 encloses in this region a space 43 by which the fluid flowing towards the ball surface is deviated or deflected by approximately 180° and thus an increased impulse force or flow force acting towards opening of the ball is generated. Due to this increased impulse force the opening rate is substantially increased compared to a planar surface of the bushing presented to the flow.

In other words, the bushing 20 has an impulse region 40 facing towards said first valve seat 18 so as to provide for an impulse force or flow force which tends to move said ball 30 away from said first valve seat as soon as the ball 30 starts moving off the first valve seat 18, wherein said impulse region 40 is formed to define at least one space 43 such that said impulse force is increased. Specifically, said impulse region 40 is provided with one space to reverse the fluid flow, wherein said impulse region 40 forms an annular impulse surface 46 facing towards said first valve seat, said impulse surface 46 being provided with a free space 43 adapted to reverse the fluid flow when said ball 30 is lifted off said first valve seat 18. More particularly, said free space 43 is an annular chamber located between an outer surface 42 of said ball 30 and an interior surface of said bushing 20.

What we claim is:

1. A poppet valve comprising a ball supported within an axial bushing (20), the ball being adapted to be urged onto the valve seat by an operating element and to be lifted off the valve seat by the force of a spring, wherein pressure is applied to the ball surface within the valve seat, wherein the end (40) of the bushing (20) facing the valve seat (18) protrudes in tangential direction beyond the periphery or equator of the ball towards said valve seat and defines together with the ball surface (42) a space (43) for fluid flow inversion and wherein a spreader ring or snap ring (32) for mounting the bushing to the ball is disposed in a circumferential groove (44) in the interior of the end (40) of the bushing (20) protruding towards the valve seat beyond the periphery or equator (41) of the ball (30) and the opposite end of the bushing is provided with an inwardly extending portion or flange (45) for supporting the ball.

* * * * *